US012663081B2

(12) United States Patent
Onodera et al.

(10) Patent No.: US 12,663,081 B2
(45) Date of Patent: Jun. 23, 2026

(54) SEALING DEVICE

(71) Applicant: NOK CORPORATION, Tokyo (JP)

(72) Inventors: Hiroshi Onodera, Fukushima (JP);
Takayuki Aihara, Fukushima (JP)

(73) Assignee: NOK CORPORATION (JP)

( * ) Notice: Subject to any disclaimer, the term of this
patent is extended or adjusted under 35
U.S.C. 154(b) by 0 days.

(21) Appl. No.: 18/716,004

(22) PCT Filed: Nov. 24, 2022

(86) PCT No.: PCT/JP2022/043285
§ 371 (c)(1),
(2) Date: Jun. 3, 2024

(87) PCT Pub. No.: WO2023/106100
PCT Pub. Date: Jun. 15, 2023

(65) Prior Publication Data
US 2025/0027565 A1 Jan. 23, 2025

(30) Foreign Application Priority Data
Dec. 6, 2021 (JP) ................................. 2021-197755

(51) Int. Cl.
*F16J 15/32* (2016.01)
*F16J 15/3232* (2016.01)
(52) U.S. Cl.
CPC .................................. *F16J 15/3232* (2013.01)
(58) Field of Classification Search
CPC ....... F16J 15/32; F16J 15/3232; F16J 15/3256
See application file for complete search history.

(56) References Cited

U.S. PATENT DOCUMENTS 9,651,155 B2 * 5/2017 Angiulli ............... F16J 15/3232
10,240,677 B2 * 3/2019 Angiulli ............... F16J 15/3268
(Continued)

FOREIGN PATENT DOCUMENTS

JP 2002-098234 A 4/2002
JP 2007-321784 A 12/2007
(Continued)

OTHER PUBLICATIONS

Notice of Reasons for Refusal issued in corresponding Japanese
Patent Application No. 2023-566215 dated Dec. 4, 2024, with
English translation (10 Pages).
(Continued)

*Primary Examiner* — Christine M Mills
*Assistant Examiner* — L. Susmitha Koneru
(74) *Attorney, Agent, or Firm* — Harness, Dickey &
Pierce, P.L.C.

(57) ABSTRACT

A sealing device is provided to achieve sealing between an
outer-periphery-side member and an inner-periphery-side
member that are able to relatively rotate, and includes: an
outer seal member to be attached to the outer-periphery-side
member; and an inner seal member to be attached to the
inner-periphery-side member. The outer seal member
includes an annular member that includes an inner tubular
portion extending along an axis direction and a seal lip
portion that slide-contacts the inner seal member on a side
closer to an internal space than the annular member. The
inner seal member includes an inner contact portion that
includes a plurality of protrusions and slide-contacts the
inner tubular portion. A length of a region of the inner
contact portion where the plurality of protrusions are formed
is longer than a minimum interval between facing portions
of the outer seal member and the inner seal member.

6 Claims, 2 Drawing Sheets

(56)         References Cited

U.S. PATENT DOCUMENTS

| | | | | |
|---|---|---|---|---|
| 2016/0298769 A1* | 10/2016 | Angiulli | ................ | F16C 33/805 |
| 2016/0298771 A1* | 10/2016 | Angiulli | ............. | F16C 33/7823 |
| 2024/0159316 A1* | 5/2024 | Bayer | ................. | F16J 15/3456 |

FOREIGN PATENT DOCUMENTS

| | | |
|---|---|---|
| JP | 2013-133882 A | 7/2013 |
| JP | 2021-131110 A | 9/2021 |
| WO | 2018-117100 A1 | 6/2018 |

OTHER PUBLICATIONS

International Search Report issued in corresponding International Application No. PCT/JP2022/043285, dated Feb. 14, 2023, with English translation (5 Pages).
Written Opinion issued in corresponding International Application No. PCT/JP2022/043285, dated Feb. 14, 2023, with English translation (8 Pages).
International Preliminary Report on Patentability issued in corresponding International Application No. PCT/JP2022/043285, dated Feb. 14, 2023, with English translation (9 Pages).
Request for the Submission of an Opinion for corresponding Korean Patent Application No. 10-2024-7018078 dated Dec. 4, 2025, with English translation (12 Pages).

* cited by examiner

SEALING DEVICE

CROSS REFERENCE TO RELATED APPLICATIONS

The present application is a national stage application of International Patent Application No. PCT/JP2022/043285 filed on Nov. 24, 2022, which claims the benefit of Japanese Patent Application No. 2021-197755, filed on Dec. 6, 2021. The contents of these applications are incorporated herein by reference in their entirety.

BACKGROUND

Technical Field

The present disclosure relates to a sealing device.

Related Art

Conventionally, sealing devices have been used to seal parts among a plurality of members that are able to relatively rotate. Such sealing devices may be used to inhibit leakage of lubricants as sealing targets provided in internal spaces of devices and inhibit invasion of mud, dust, and the like from a side of the atmosphere. Thus, a sealing device provided with a plurality of protrusions in addition of a dust lip portion in order to inhibit invasion of dust and the like has been proposed (see International Publication No. WO 2018/117100, for example).

In the sealing device described in International Publication No. WO 2018/117100, the plurality of protrusions are provided in a rotating seal member and are adapted to come into sealing contact with a cylindrical part of a fixed seal member on a side closer to the atmosphere than the dust lip portion. In this manner, reduction of invasion of foreign matters from the side of the atmosphere to the internal space is achieved.

In some devices provided with sealing devices, positional deviation in a thrust direction (axial direction) may be likely to occur between outer-periphery-side members and inner-periphery-side members that are able to relatively rotate. According to such devices, invasion of foreign matters is inhibited by the plurality of protrusions if the sealing device described in International Publication No. WO 2018/117100 is used, while it is difficult to maintain sealing performance in a case in which positional deviation in the thrust direction occurs.

The present disclosure was made in view of the afore-mentioned problem, and an object of the present disclosure is to provide a sealing device capable of maintaining sealing performance even if positional deviation in a thrust direction occurs.

SUMMARY

In order to achieve the above object, a sealing device according to the present disclosure is a sealing device to achieve sealing between an outer-periphery-side member and an inner-periphery-side member that are able to rela-tively rotate, the sealing device including: an outer seal member to be attached to the outer-periphery-side member; and an inner seal member to be attached to the inner-periphery-side member, in which the outer seal member includes an annular member that includes an axially extend-ing portion extending along an axial direction and a seal lip portion that slide-contacts the inner seal member on a side closer to an internal space than the annular member, the inner seal member includes a contact portion that includes a plurality of protrusions and slide-contacts the axially extend-ing portion, the outer seal member and the inner seal member include at least one pair of facing portions on a side closer to an atmosphere than the seal lip portion and a side closer to an outer periphery than the axially extending portion, the facing portions facing each other at an interval in the axial direction, and a length of a region of the contact portion where the plurality of protrusions are formed in the axial direction is longer than a minimum interval of the at least one facing portion.

In the sealing device according to an aspect of the present disclosure, the outer seal member integrally includes an inner tubular portion as the axially extending portion, an outer tubular portion disposed on a side closer to the outer periphery than the inner tubular portion, and a connecting portion that connects the inner tubular portion and the outer tubular portion, the inner seal member integrally includes an inner contact portion as the contact portion that slide-contacts the inner tubular portion, an outer contact portion that slide-contacts the outer tubular portion, and a contact connecting portion that connects the inner contact portion and the outer contact portion, and the connecting portion and the inner contact portion or the outer contact portion form the facing portion, and the contact connecting portion and the inner tubular portion or the outer tubular portion form the facing portion.

In the sealing device according to an aspect of the present disclosure, the contact connecting portion is formed into an annular shape, and the inner contact portion and the outer contact portion extend from the contact connecting portion toward the side of the atmosphere.

In the sealing device according to an aspect of the present disclosure, the inner contact portion slide-contacts the inner tubular portion from the inner periphery side, and the outer contact portion slide-contacts the outer tubular portion from the inner periphery side.

In the sealing device according to an aspect of the present disclosure, the inner seal member includes a flange portion with an annular shape on a side closer to an internal space than the annular member and on the side closer to the atmosphere than the seal lip portion, and the outer seal member includes an annular contact portion that includes a plurality of protrusions and slide-contacts the flange portion.

In the sealing device according to an aspect of the present disclosure, the outer seal member includes a recessed por-tion with a recessed shape in the axial direction in a path from a space on the side of the atmosphere toward the annular contact portion.

Effects of Disclosure

According to the sealing device of the present disclosure, it is possible to maintain sealing performance even if posi-tional deviation in a thrust direction occurs.

DETAILED DESCRIPTION

Figure 1:
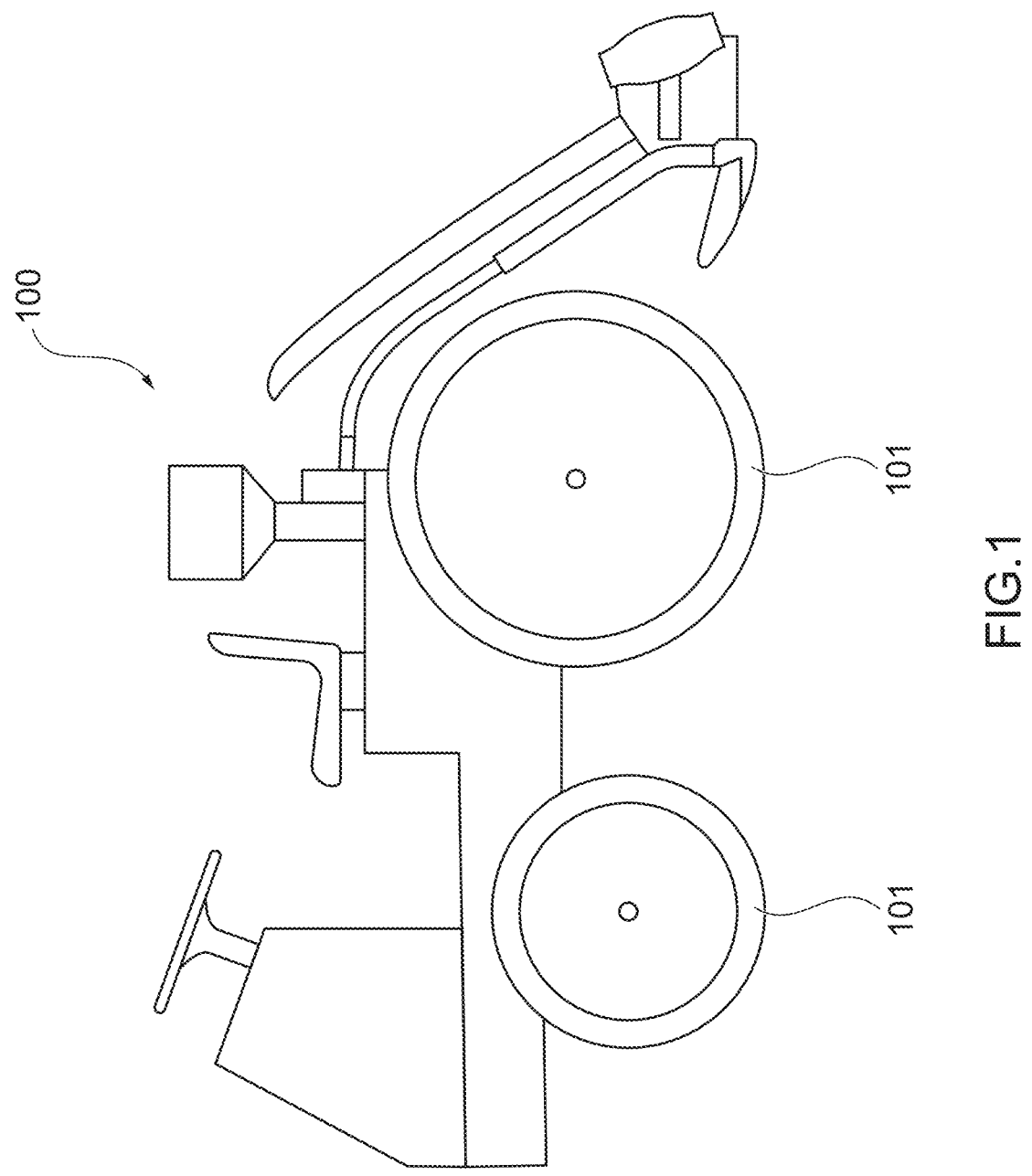
FIG. 1 is a side view schematically illustrating an agri-cultural machine as an example of a device for which a sealing device according to an embodiment of the present disclosure is used.
Figure 2:
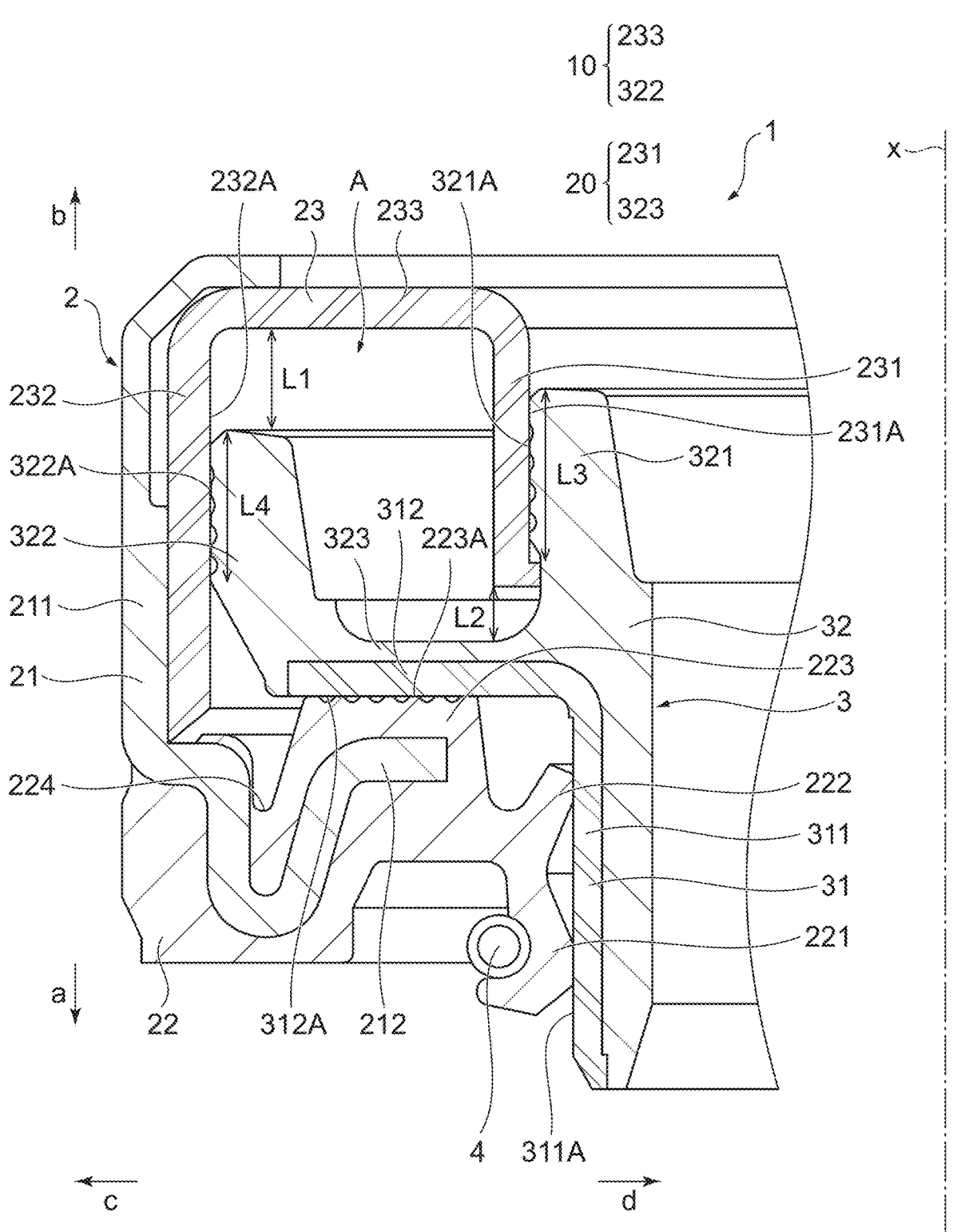
FIG. 2 is a sectional view of the sealing device according to the embodiment of the present disclosure.

Hereinafter, an embodiment of the present disclosure will be described with reference to the drawings. FIG. 1 is a side view schematically illustrating an agricultural machine 100 as an example of a device for which a sealing device 1 according to an embodiment of the present disclosure is used, and FIG. 2 is a sectional view of the sealing device 1 according to the embodiment of the present disclosure. The sealing device 1 is used in a truck for a railway vehicle, a carriage for a sintered pallet, a construction machine, or a trunnion-type suspension for a truck, for example, as well as the agricultural machine, to inhibit leakage of a lubricant as a sealing target inside the device to the outside of the device (atmosphere) and inhibit invasion of foreign matters such as liquid, dust, and mud from the outside to the inside of the device. The agricultural machine 100 as an example of the device for which the sealing device 1 is used includes wheels 101 and a drive unit for driving and rotating the wheels 101. For example, it is only necessary to provide the sealing device 1 for axles of the wheels 101, an output shaft of the drive unit, and the like. Since such an agricultural machine 100 is used in a situation in which many foreign matters such as mud are present, the sealing device 1 is required to have foreign matter resistance. Also, vibration or the like is likely to occur in the agricultural machine 100, and positional deviation (particularly, positional deviation in a thrust direction) is likely to occur at a part where the sealing device 1 is provided.

The sealing device 1 according to the embodiment of the present disclosure is a sealing device to achieve sealing between an outer-periphery-side member and an inner-periphery-side member that are able to relatively rotate, and includes an outer seal member 2 to be attached to the outer-periphery-side member and an inner seal member 3 to be attached to the inner-periphery-side member. The outer seal member 2 includes an annular member 23 that includes an inner tubular portion 231 as an axially extending portion extending along an axis x direction, and a seal lip portion 221 that slide-contacts the inner seal member 3 on a side closer to an internal space than the annular member 23. The inner seal member 3 includes an inner contact portion 321 that includes a plurality of protrusions 321A and slide-contacts the inner tubular portion 231. The Outer seal member 2 and the inner seal member 3 include at least one pair of facing portion 10, 20 on the side closer to the atmosphere than a seal lip portion 221 and the side closer to the outer periphery than the inner tubular portion 231, the facing portions 10, 20 facing each other at an interval in the direction of the axis x, and a length L3 of a region of the inner contact portion 321 where the plurality of protrusions 321A are formed in the axis x direction is longer than a minimum interval L2 of the at least one facing portion 10, 20.

Hereinafter, an arrow a (see FIG. 2) direction (one side in the axial direction) in the axis x direction of the sealing device 1 will be defined as a side of an internal space, and an arrow b (see FIG. 2) direction (the other side in the axial direction) in the axis x direction will be defined as the side of the atmosphere for convenience of explanation. Also, a direction (an arrow c direction in FIG. 2) separated from the axis x in a direction perpendicular to the axis x (hereinafter, also referred to as a "radial direction") will be defined as an outer periphery side, and a direction (an arrow d direction in FIG. 2) toward the axis x will be defined as an inner periphery side. When positional relationships and directions of the respective members are explained in the following description, positional relationships and directions only in the drawings are illustrated, and positional relationships and direction in actual assembly in a vehicle or the like are not illustrated.

The outer-periphery-side member is a housing with a through-hole formed therein, for example, and the outer seal member 2 is attached to an inner peripheral surface of the through-hole and functions as a fixed seal member. The inner-periphery-side member is a rotation shaft to be inserted into the through-hole, for example, and the inner seal member 3 is attached to an outer peripheral surface of the rotation shaft and functions as a rotating seal member. The outer seal member 2 and the inner seal member 3 are fitted to each other, and a most part of the inner seal member 3 with an annular shape is surrounded by the outer seal member 2 with an annular shape.

The outer seal member 2 includes a reinforcement ring 21, an elastic body portion 22 integrally formed with the reinforcement ring 21 by an elastic body, and an annular member 23. The elastic body of the elastic body portion 22 is a rubber material such as fluororubber or an acrylic rubber, for example. The reinforcement ring 21 is made of metal, for example, and is manufactured through press working or forging, and the elastic body portion 22 is molded through crosslinking (vulcanization) molding using a mold.

The reinforcement ring 21 includes a tubular portion 211, and a flange portion 212 with an annular shape extending on the inner periphery side from an end portion of the tubular portion 211 on the side of the internal space. An end portion of the tubular portion 211 on the side of the atmosphere is bent toward the inner periphery side. The tubular portion 211 is formed into a cylindrical shape or a substantially cylindrical shape around the axis x. The flange portion 212 is formed into an annular shape or a substantially annular shape around the axis x direction as a whole, is buried in the elastic body portion 22, and is bent to extend from the end portion of the tubular portion 211 on the side of the internal space toward the inner periphery side in order, extend toward the inner periphery side, extend toward the side of the internal space, extend toward the side of the atmosphere, and extend toward the inner periphery side.

The elastic body portion 22 is provided to mainly cover the flange portion 212, is formed into an annular shape or a substantially annular shape around the axis x as a whole, and includes the seal lip portion 221, a dust lip portion 222, and an annular contact portion 223. Note that a configuration in which two or more dust lip portions are provided may be employed. The seal lip portion 221 extends from a vicinity of an edge of the flange portion 212 on the inner periphery side toward the side of the internal space as the seal lip portion 221 approaches the inner periphery side. A garter spring 4 is provided on the outer periphery side of the seal lip portion 221. The dust lip portion 222 extends from the vicinity of the edge of the flange portion 212 on the inner periphery side toward the side of the atmosphere as the dust lip portion 222 approaches the inner periphery side.

An annular contact portion 223 is provided on the side of the atmosphere relative to the flange portion 212 and includes a plurality of protrusions 223A in a surface facing the side of the atmosphere. The plurality of protrusions 223A of the annular contact portion 223 are formed into circular shapes or substantially circular shapes around the axis x direction and are concentrically disposed. Also, a recessed portion 224 is formed in the elastic body portion 22 on the outer periphery side of the annular contact portion 223. The recessed portion 224 corresponds to a part of the flange portion 212 extending toward the side of the internal space and then toward the side of the atmosphere and has a shape opening toward the side of the atmosphere.

The annular member 23 is made of metal, for example, and is manufactured through press working or forging. The annular member 23 integrally includes the inner tubular portion 231 as the axially extending portion extending along the axis x direction, an outer tubular portion 232 disposed on the side closer to the outer periphery than the inner tubular portion 231, and a connecting portion 233 that connects the inner tubular portion 231 and the outer tubular portion 232. The inner tubular portion 231 and the outer tubular portion 232 are formed into cylindrical shapes or substantially cylindrical shapes around the axis x, and the inner tubular portion 231 has a larger dimension in the axis x direction than the outer tubular portion 232. The connecting portion 233 connects end portions of the inner tubular portion 231 and the outer tubular portion 232 on the side of the atmosphere and is formed into an annular shape or a substantially annular shape around the axis x. In this manner, the annular member 23 has a sectional shape with a U shape.

The annular member 23 is disposed such that the outer tubular portion 232 contacts the inner peripheral surface of the tubular portion 211 of the reinforcement ring 21, and is fixed to the reinforcement ring 21 through fitting, for example.

The inner seal member 3 includes a reinforcement ring 31 and an elastic body portion 32 integrally formed with the reinforcement ring 31 by an elastic body. The elastic body of the elastic body portion 32 is a rubber material such as fluororubber or an acrylic rubber, for example. The reinforcement ring 31 is made of metal, for example, and is manufactured through press working or forcing, and the elastic body portion 32 is molded through crosslinking (vulcanization) molding using a mold.

The reinforcement ring 31 integrally includes a tubular portion 311 with a cylindrical shape or a substantially cylindrical shape around the axis x and a flange portion 312 formed into an annular shape or a substantially annular shape around the axis x. The flange portion 312 extends from an end portion of the tubular portion 311 on the side of the atmosphere toward the outer periphery side, and the reinforcement ring 31 has a sectional shape with an L shape.

The elastic body portion 32 is provided to mainly cover the inner periphery side and the side of the atmosphere of the reinforcement ring 31, and integrally includes the inner contact portion 321 as a contact portion that contacts the inner tubular portion 231 that is the axially extending portion, an outer contact portion 322, and a contact connecting portion 323. The contact connecting portion 323 is formed into an annular shape or a substantially annular shape around the axis x. The inner contact portion 321 extends from an end portion of the contact connecting portion 323 on the inner periphery side toward the side of the atmosphere and is formed into a cylindrical shape or a substantially cylindrical shape around the axis x. The outer contact portion 322 extends from an end portion of the contact connecting portion 323 on the outer periphery side toward the side of the atmosphere, and is formed into a cylindrical shape or a substantially cylindrical shape around the axis x. In this manner, the elastic body portion 32 has a part with a U sectional shape integrally formed by the inner contact portion 321, the outer contact portion 322, and the contact connecting portion 323. Note that the end portion of the inner contact portion 321 on the side of the atmosphere is located to the side closer to the atmosphere than the end portion of the outer contact portion 322 on the side of the atmosphere.

The inner contact portion 321 and the outer contact portion 322 includes a plurality of protrusions 321A and 322A on outer peripheral surfaces, respectively. The plurality of protrusions are formed into circular shapes around the axis x and are aligned along the axis x direction.

Here, positional relationships between respective portions of the outer seal member 2 and respective portions of the inner seal member 3 in the sealing device 1 will be described. The seal lip portion 221 and the dust lip portion 222 of the outer seal member 2 slide-contact an outer peripheral surface 311A of the tubular portion 311 in the reinforcement ring 31 of the inner seal member 3. At this time, the seal lip portion 221 slide-contacts the outer peripheral surface 311A on the side closer to the internal space than the annular member 23.

The annular contact portion 223 of the outer seal member 2 slide-contacts an internal-space-side surface 312A of the flange portion 312 in the reinforcement ring 31 of the inner seal member 3 from the side of the internal space. At this time, the annular contact portion 223 is disposed on the side closer to the atmosphere than the seal lip portion 221, and the flange portion 312 is disposed on the side closer to the internal space than the annular member 23 and is disposed on the side closer to the atmosphere than the seal lip portion 221.

The inner contact portion 321 of the inner seal member 3 slide-contacts an inner peripheral surface 231A of the inner tubular portion 231 in the annular member 23 of the outer seal member 2. In other words, the inner contact portion 321 slide-contacts the inner tubular portion 231 from the inner periphery side. The outer contact portion 322 of the inner seal member 3 slide-contacts an inner peripheral surface 232A of the outer tubular portion 232 in the annular member 23 of the outer seal member 2. In other words, the outer contact portion 322 slide-contacts the outer tubular portion 232 from the inner periphery side.

A sealing structure as will be described below is formed by the sealing device 1 having the structure as described above. First, a space A surrounded by the annular member 23 with a U sectional shape opening on the side of the internal space and a part of the elastic body portion 32 with a U sectional shape opening on the side of the atmosphere is formed by the inner contact portion 321 and the outer contact portion 322 slide-contacting the inner tubular portion 231 and the outer tubular portion 232, respectively.

The space A has a labyrinth structure. In order for foreign matters to move from the side of the atmosphere toward the side of the internal space and pass through the space A, it is necessary for the foreign matters to move from the side of the atmosphere toward the side of the internal space and pass between the inner contact portion 321 and the inner tubular portion 231, to move from the side of the internal space toward the side of the atmosphere inside the space A, and to move from the side of the atmosphere toward the side of the internal space and pass between the outer contact portion 322 and the outer tubular portion 232. In other words, the foreign matters have to reciprocate in the axis x direction and cannot pass through the space A only by moving in one direction.

Furthermore, in order for the foreign matters to reach the dust lip portion 222 even if the foreign matters have passed through the space A, it is necessary for the foreign matters to pass between the annular contact portion 223 and the flange portion 312. At this time, a moving direction of the foreign matters is a direction toward the inner periphery side, which is a direction intersecting a direction to pass through the space A. Furthermore, the foreign matters are easily trapped by the recessed portion 224 being formed in a path from the space A toward the annular contact portion 223.

The connecting portion 233 and the outer contact portion 322 face each other at an interval L1 in the axis x direction on the side closer to the atmosphere than the seal lip portion 221 and on the side closer to the outer periphery than the inner tubular portion 231, and the connecting portion 233 and the outer contact portion 322 serve as a pair of facing portions 10. Also, the inner tubular portion 231 and the contact connecting portion 323 face each other at an interval L2 in the axis x direction on the side closer to the atmosphere than the seal lip portion 221, and the inner tubular portion 231 and the contact connecting portion 323 serve as a pair of facing portions 20. In other words, the outer seal member 2 and the inner seal member 3 includes two pairs of facing portions 10 and 20. In the present embodiment, the interval L2 between the facing portions 20 is shorter than the interval L1 between the facing portions 10. Also, both lengths L3 and L4 of regions of the inner contact portion 321 and the outer contact portion 322 where the plurality of protrusions 321A and 322A are formed in the axis x direction are longer than the interval L2.

The amount of maximum positional deviation when positional deviation in the thrust direction (the axis x direction) occurs between the outer seal member 2 and the inner seal member 3 is equal to a shorter one (that is, the interval L2) of the intervals L1 and L2 between the facing portions 10 and 20. At this time, the lengths L3 and L4 of the regions where the plurality of protrusions 321A and 322A are formed in the axis x direction are longer than the interval L2, and the contact between the protrusions 321A and 322A and the tubular portions 231 and 232 is thus maintained even if positional deviation in the thrust direction occurs.

In this manner, according to the sealing device 1 of the embodiment of the present disclosure, the length L3 of the region of the inner contact portion 321 where the plurality of protrusions 321A are formed in the axis x direction is longer than the minimum interval L2 between the facing portions 10 and 20 facing each other in the axis x direction, the contact between the protrusions 321A and the tubular portion 231 is thus maintained even if positional deviation in the thrust direction occurs, and sealing performance can be maintained even if the positional deviation in the thrust direction occurs.

Also, it is possible to form the space A with the labyrinth structure and to improve performance of inhibiting invasion of foreign matters, by the annular member 23 of the outer seal member 2 integrally including the inner tubular portion 231, the outer tubular portion 232, and the connecting portion 233, by the elastic body portion 32 of the inner seal member 3 integrally including the inner contact portion 321, the outer contact portion 322, and the contact connecting portion 323, by the inner contact portion 321 slide-contacting the inner tubular portion 231, and by the outer contact portion 322 slide-contacting the outer tubular portion 232.

Also, it is possible to form the part with the U sectional shape by the contact connecting portion 323 being formed into an annular shape and by the inner contact portion 321 and the outer contact portion 322 extending from the contact connecting portion 323 toward the side of the atmosphere. In this manner, it is possible to facilitate formation of the space A through combination with the annular member 23 with the U sectional shape.

Also, it is possible to facilitate sliding contact with a target as compared with a configuration in which each contact portion is caused to slide-contact from the outer periphery side, by the inner contact portion 321 slide-contacting the inner tubular portion 231 from the inner periphery side and by the outer contact portion 322 slide-contacting the outer tubular portion 232 from the inner periphery side. Also, directions of forces of pressing the target coincide by the two contact portions coming into slide contact from the same side, and it is possible to facilitate assembly of the outer seal member 2 and the inner seal member 3.

Moreover, it is possible to facilitate inhibition of foreign matters moving toward the dust lip portion 222 even in a case in which the foreign matters have passed through the space A, by the annular contact portion 223 being provided in addition to the inner contact portion 321 and the outer contact portion 322.

Note that the present disclosure is not limited to the aforementioned embodiment and includes other configurations and the like with which the object of the present disclosure can be achieved, and modifications and the like as will be described below are also included in the present disclosure. For example, although the contact connecting portion 323 is formed into an annular shape in the aforementioned embodiment, the shape of the contact connecting portion is not limited thereto and may be a tubular shape or another shape. Also, the inner contact portion and the outer contact portion may extend from the contact connecting portion toward the side of the internal space, and at this time, it is only necessary for the inner tubular portion and the outer tubular portion in the annular member to extend from the connecting portion toward the side of the atmosphere.

In addition, although the inner contact portion 321 slide-contacts the inner tubular portion 231 from the inner periphery side, and the outer contact portion 322 slide-contacts the outer tubular portion 232 from the inner periphery side in the aforementioned embodiment, each contact portion may contact each tubular portion from any of the inner periphery side and the outer periphery side. Also, the side on which the inner contact portion comes into contact and the side on which the outer contact portion comes into contact may differ from each other.

Also, although the annular contact portion 223 is provided in addition to the inner contact portion 321 and the outer contact portion 322 in the aforementioned embodiment, the annular contact portion may be omitted. Moreover, a contact portion to inhibit passing of foreign matters may be provided on the side of the atmosphere relative to the space A.

Also, although the outer seal member 2 includes the recessed portion 224 with a recessed shape in the axis x direction in the path from the space A on the side of the atmosphere toward the annular contact portion 223 in the aforementioned embodiment, the recessed portion may be formed in another part, or such a recessed portion may be omitted depending on an assumed amount of invasion of foreign matters.

Also, although the length L3 of the contact portion 321 is longer than the interval L2 in the aforementioned embodiment, it is only necessary for the length of the region where the plurality of protrusions are formed in the axial direction to be longer than the minimum interval between the facing portions in at least one contact portion disposed on the side closer to the inner periphery than the facing portions in a case in which a plurality of contact portions are provided. Moreover, the number of contact portions and the number of tubular portions disposed on the side closer to the inner periphery than the facing portions may be at least one.

Additionally, although each portion of the sealing device 1 is formed into an annular shape, a substantially annular shape, a cylindrical shape, or a substantially cylindrical shape in the aforementioned embodiment, it is only necessary for the portions to have annular shapes, and it is only necessary for the specific shapes of the portions to correspond to the outer-periphery-side member and the inner-periphery-side member.

Although the embodiment of the present disclosure has been described above, the present disclosure is not limited to the sealing device according to the above embodiment of the present disclosure and includes all aspects included in the concept of the present disclosure and the scope of the claims. Also, the respective configurations may be appropriately and selectively combined to achieve at least some of the problems and the advantages described above. For example, the shape, the material, the disposition, the size, and the like of each component in the above embodiment may be appropriately modified in specific utilization aspects of the present disclosure.

The invention claimed is:

1. A sealing device to achieve sealing between an outer-periphery-side member and an inner-periphery-side member that are able to relatively rotate, the sealing device comprising:

an outer seal member to be attached to the outer-periphery-side member; and an inner seal member to be attached to the inner-periphery-side member, wherein the outer seal member includes an annular member that includes an axially extending portion extending along an axial direction and a seal lip portion that slide-contacts the inner seal member on a side closer to an internal space than the annular member, the inner seal member includes a contact portion that includes a plurality of protrusions and slide-contacts the axially extending portion, the outer seal member and the inner seal member include at least one pair of facing portions on a side closer to an atmosphere than the seal lip portion and a side closer to an outer periphery than the axially extending portion, the facing portions facing each other at an interval in the axial direction, and a length of a region of the contact portion where the plurality of protrusions are formed in the axial direction is longer than a minimum interval of the at least one facing portion, the outer seal member integrally includes an inner tubular portion as the axially extending portion, an outer tubular portion disposed on a side closer to the outer periphery than the Inner tubular portion, and a connecting portion that connects the inner tubular portion and the outer tubular portion, and the connecting portion is spaced apart from the inner sealing member in the axial direction.

2. The sealing device according to claim 1, wherein the inner seal member integrally includes an inner contact portion as the contact portion that slide-contacts the inner tubular portion, an outer contact portion that slide-contacts the outer tubular portion, and a contact connecting portion that connects the inner contact portion and the outer contact portion, and the connecting portion and the inner contact portion or the outer contact portion form the facing portion, and the contact connecting portion and the inner tubular portion or the outer tubular portion form the facing portion.

3. The sealing device according to claim 2, wherein the contact connecting portion is formed into an annular shape, and the inner contact portion and the outer contact portion extend from the contact connecting portion toward the side of the atmosphere.

4. The sealing device according to claim 3, wherein the inner contact portion slide-contacts the inner tubular portion from the inner periphery side, and the outer contact portion slide-contacts the outer tubular portion from the inner periphery side.

5. The sealing device according to claim 2, wherein the inner seal member includes a flange portion with an annular shape on a side closer to an internal space than the annular member and on the side closer to the atmosphere than the seal lip portion, and the outer seal member includes an annular contact portion that includes a plurality of protrusions and slide-contacts the flange portion.

6. The sealing device according to claim 5, wherein the outer seal member includes a recessed portion with a recessed shape in the axial direction in a path from a space on the side of the atmosphere toward the annular contact portion.

* * * * *